United States Patent
Kobayashi et al.

(10) Patent No.: US 6,670,844 B2
(45) Date of Patent: Dec. 30, 2003

(54) CHARGE PUMP CIRCUIT

(75) Inventors: Fumikazu Kobayashi, Nasu-gun (JP);
Shuuji Sakamoto, Nasu-gun (JP);
Toshiaki Matsubara, Nasu-gun (JP)

(73) Assignee: Nippon Precision Circuits Inc., Tokyo (JP)

( * ) Notice: Subject to any disclaimer, the term of this patent is extended or adjusted under 35 U.S.C. 154(b) by 0 days.

(21) Appl. No.: 10/237,714

(22) Filed: Sep. 4, 2002

(65) Prior Publication Data

US 2003/0058665 A1 Mar. 27, 2003

(30) Foreign Application Priority Data

Sep. 21, 2001 (JP) ........................................ 2001-289296

(51) Int. Cl.[7] ................................................ G05F 1/56
(52) U.S. Cl. .................................. 327/536; 363/60
(58) Field of Search .......................... 327/536; 363/59, 363/60; 365/189.09, 226

(56) References Cited

U.S. PATENT DOCUMENTS 5,905,291 A * 5/1999 Utsunomiya et al. ......... 363/60
6,603,346 B2 * 8/2003 Sawada et al. ............. 327/536
2002/0190689 A1 * 12/2002 Nakamura et al. .......... 320/102
2003/0011419 A1 * 1/2003 Moriyama .................. 327/536

* cited by examiner

Primary Examiner—Timothy P. Callahan
Assistant Examiner—Terry L. Englund
(74) Attorney, Agent, or Firm—Jordan and Hamburg LLP

(57) ABSTRACT

A highly efficient charge pump circuit featuring easy circuit design and formation as well as high reliability includes transistors $M_1$–$M_4$ individually having a diode connection configuration and interconnected in cascade, and is adapted to alternately apply a clock signal and an inverted clock signal to the transistors via capacitor elements $C_1$–$C_4$. The charge pump employs a depression-type transistor as the transistors $M_1$–$M_4$ and has an arrangement wherein the transistors $M_1$, $M_2$ on an input side have a greater gate length than the succeeding transistors $M_3$, $M_4$ for increasing the efficiency of boosting voltage. The charge pump circuit includes a single type of device so as to facilitate the circuit design and formation and also to enhance the reliability thereof.

1 Claim, 2 Drawing Sheets

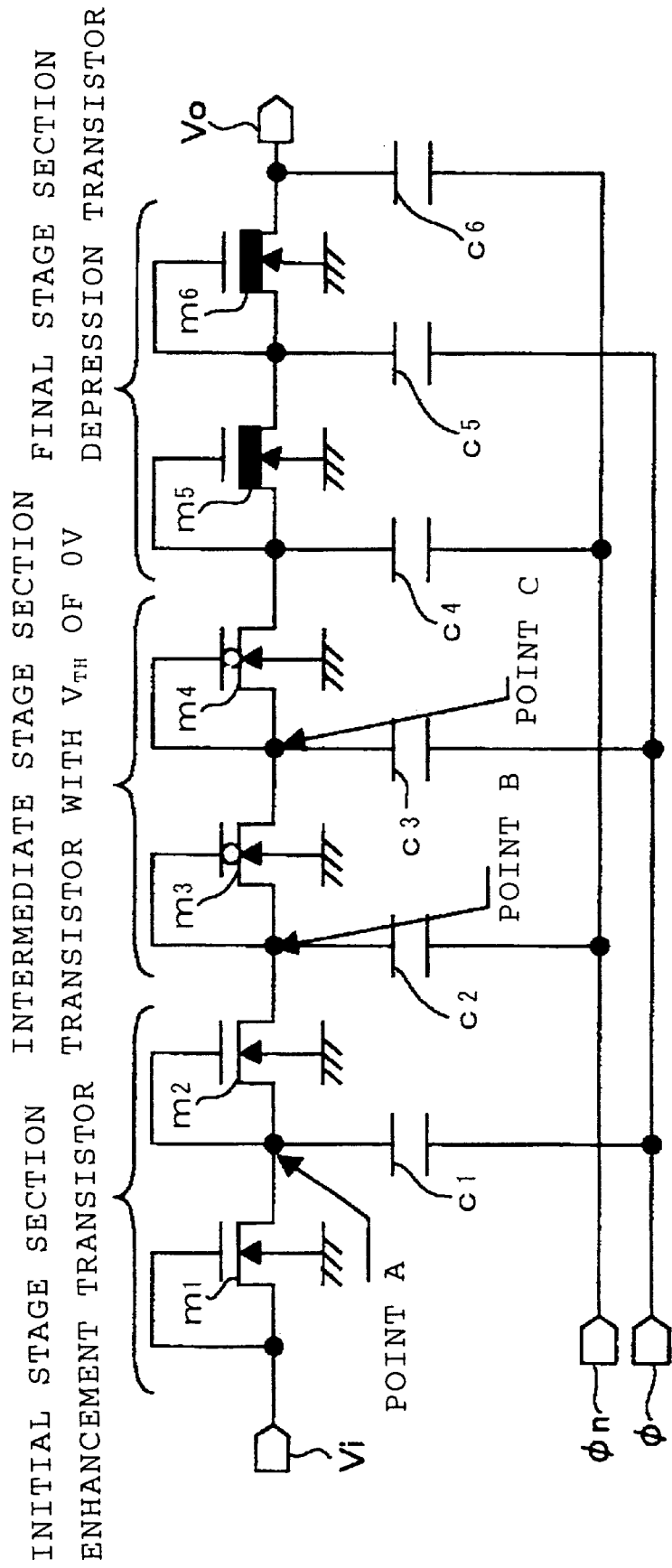

CHARGE PUMP CIRCUIT

BACKGROUND OF THE INVENTION

1. Field of the Invention

The present invention relates to a charge pump circuit which is used for boosting a voltage supplied to an integrated circuit from an external voltage source and supplying the boosted voltage to an internal circuit.

2. Prior Art

As a conventional charge pump, there is known one, for example, which is disclosed in Japanese Examined Patent Publication No. 68188/1993. As shown in FIG. 2, this charge pump includes MOS transistors $m_1$–$m_6$ each having its drain and gate interconnected via a so-called diode connection and having respective sources and drains thereof interconnected thereby defining multiple stages interconnected in cascade, and capacitor elements $c_1$ to $c_6$ individually connected to the respective sources of the MOS transistors $m_1$–$m_6$, and is designed to obtain a boosted voltage $V_o$ from the final stage MOS transistor $m_6$ by applying an input voltage $V_i$ to the drain and gate of the initial stage MOS transistor $m_1$ and then alternately applying a clock signal $\phi$ and an inverted clock signal $\phi_n$ to the MOS transistors $m_1$–$m_6$ via the respective capacitor elements $c_1$–$c_6$. The conventional charge pump has an arrangement wherein some initial stages on an input side, such as MOS transistors $m_1$, $m_2$ for example, are comprised of an enhancement-type transistor; intermediate stages, MOS transistors $m_3$, $m_4$, are comprised of a transistor having a threshold voltage of 0V; and final stages, MOS transistors $m_5$, $m_6$, are comprised of a depression-type transistor.

A threshold voltage for each of the transistors is expressed as $V_{th}+^{\Delta}V_{th(B)}$, where $V_{th}$ denotes a threshold voltage of the transistor when a substrate bias voltage is at 0V; and $^{\Delta}V_{th(B)}$ denotes an amount of variation of the threshold voltage due to the substrate bias voltage. Assuming that the clock signal $\phi$ is at high level, a potential at Point A in FIG. 2 is expressed as $V_i-(V_{th}+^{\Delta}V_{th(i)})$ ($=V_{A0}$), where $V_i$ denotes the input voltage. At this time, the inverted clock signal $\phi_n$ rises, so that a potential at Point B is at $V\phi$ ($=V_{B0}$). On the other hand, a potential at Point C is expressed as $V_i-(V_{th}+^{\Delta}V_{th(i)})(=V_{C0})$ Next, the succeeding clock signal $\phi$ rises so that the potential at Point A is expressed as $V_i-(V_{th}+\Delta V_{th(i)})+V\phi(=V_{A1})$, whereas the potential at Point B is expressed as $V_{A1}-(V_{th}+^{\Delta}V_{th(A1)})(=V_{B1})$. At this time, the potential at Point C is expressed as $V_{C0}+V\phi(=V_{C1})$. When the clock signal $\phi$ rises again, the potential at Point A is returned to $V_{A0}$, whereas the potential at Point B is expressed as $V_{B1}+V\phi$ ($=V_{B2}$) and the potential at Point C is expressed as $V_{B1}-(V_{th}+^{\Delta}V_{th(B1)})(=V_{C2})$. Subsequently, when the clock signal $\phi$ rises again, the potential at Point A is $V_{A1}$, whereas the potential at Point B is returned to $V_{B1}$ and the potential at Point C is expressed as $V_{C2}+V\phi$.

Although the charge pump is adapted to gradually boost the input voltage by repeating the above operations in cycles, the value of $^{\Delta}V_B$ is progressively increased toward the succeeding stages with respect to the input side so that the efficiency of boosting the voltage is correspondingly lowered. As a solution to this drawback, the intermediate stages and the succeeding stages employ the transistor having the threshold voltage of 0V and the device having a low $V_{th}$, such as the depression-type transistor or the like, thereby providing for the voltage boost involving little decrease in the efficiency of boosting the voltage.

SUMMARY OF THE INVENTION

However, the conventional charge pump employs three types of devices which include the enhancement transistor defining the initial stage with respect to the input side; the transistor with the $V_{th}$ of 0V defining the intermediate stage; and the depression transistor defining the final stage. The use of the plural types of devices leads to a difficult implementation of each of the devices in the fabrication procedure and also entails a lowered reliability of the circuit. Furthermore, a circuit simulation uses plural models, which leads to an inability to perform the simulation with high accuracies.

In this connection, the invention is directed to a charge pump circuit comprised of one type of device thereby overcoming the above problem.

A charge pump circuit according to the invention comprises: a plurality of transistors individually having a diode connection configuration and defining multiple stages interconnected in cascade, and capacitor elements connected to the respective transistors, and is designed to obtain a boosted voltage from a final stage of the transistors by inputting a given voltage to an initial stage of the transistors and then alternately applying a clock signal and an inverted clock signal to the plurality of transistors via the respective capacitor elements, wherein the plurality of transistors are of depression type, and wherein a predetermined number of stages of the transistors have a greater gate length than the succeeding stages of the transistors.

BRIEF DESCRIPTION OF THE DRAWINGS

FIG. 2 is an electric circuit diagram showing a configuration of a prior-art charge pump circuit.

DESCRIPTION OF THE PREFERRED EMBODIMENTS

Figure 1:
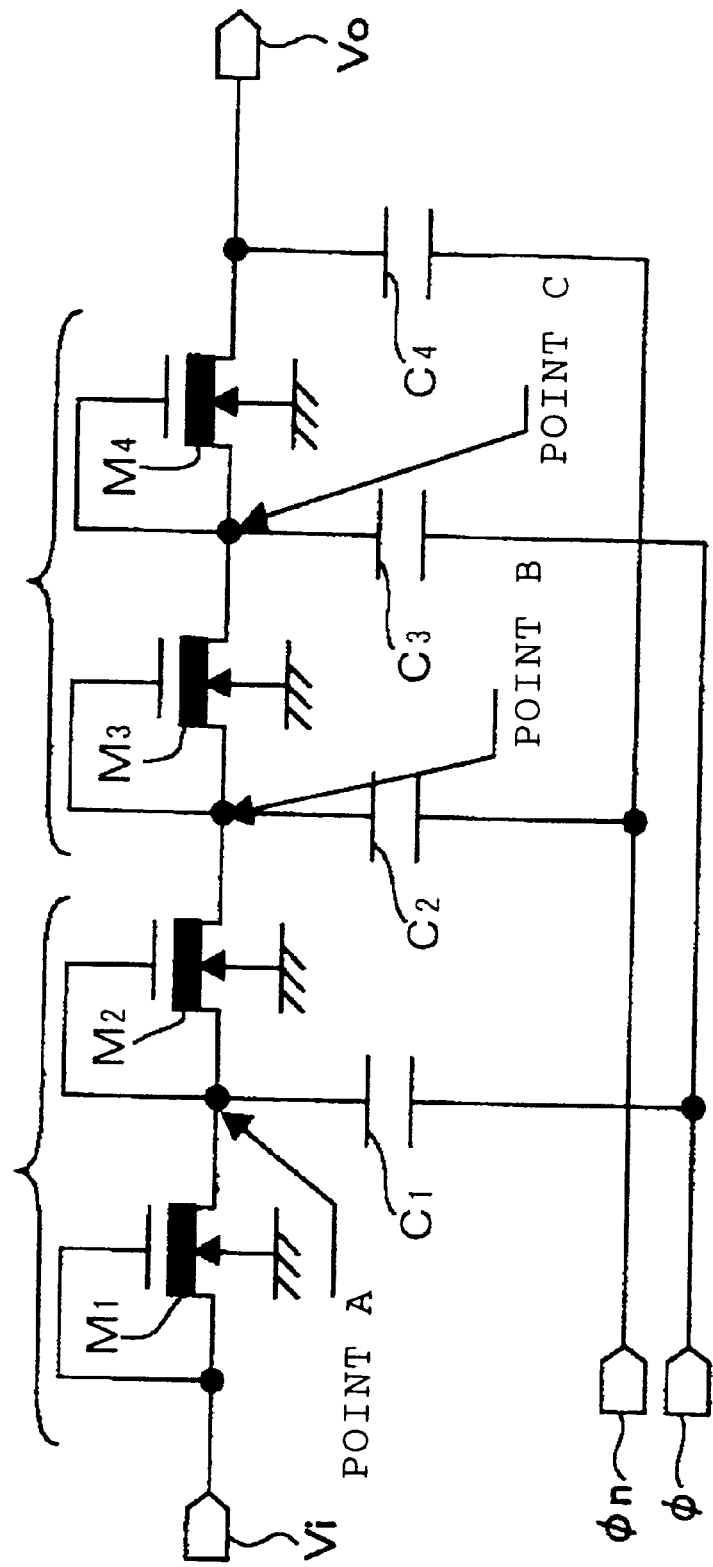
FIG. 1 is an electric circuit diagram showing a configuration of a charge pump circuit according to an embodiment of the invention.

A preferred embodiment of the invention will hereinbelow be described in detail with reference to the accompanying drawings.

As follows is a description of a charge pump circuit according to the embodiment of the invention. FIG. 1 is an electric circuit diagram showing a configuration of the embodiment. The charge pump circuit according to this embodiment includes depression-type N-channel MOS transistors $M_1$–$M_4$ each having its gate and drain interconnected via a so-called diode connection and individually having their respective sources and drains interconnected thereby defining multiple stages interconnected in cascade, and capacitor elements $C_1$–$C_4$ individually connected to the respective sources of the MOS transistors $M_1$–$M_4$. The charge pump circuit operates as follows. A given input voltage $V_i$ is applied to the drain and gate of the initial stage MOS transistor $M_1$. Then a clock signal $\phi$ and an inverted clock signal $\phi_n$ are alternately supplied to the MOS transistors $M_1$–$M_4$ via the respective capacitor elements $C_1$–$C_4$ so that a boosted voltage $V_o$ is obtained from the final stage MOS transistor $M_4$.

The charge pump circuit according to the embodiment is nearly the same as the conventional one in the basic configuration wherein the transistors having the diode connection configuration are interconnected in cascade and are alternately supplied with the clock signal and the inverted clock signal of an inverted phase via the respective capacitor elements. The charge pump circuit of the embodiment differs from the conventional one in that all the MOS transistors are the depression-type transistor and that a predetermined number of stages of the transistors on the input side have a greater gate length than the succeeding stages of the transistors. Specifically, the charge pump circuit of the embodiment comprises an initial stage section including the depression-type MOS transistors $M_1$, $M_2$ having the diode connection configuration and the greater gate length, and a final stage section including the depression-type MOS transistors $M_3$, $M_4$ having the diode connection configuration and the shorter gate length, the transistors $M_1$–$M_4$ vertically interconnected. A ratio of the gate lengths L between the initial stage section and the final stage section is, for example, 5:2.

Next, the operations of the embodiment will be described with reference to FIG. 1. First, it is provided that $V_{th}$ (<0) denotes a threshold voltage of the depression transistor when a substrate voltage is at 0V, whereas $\Delta V_{th(B)}$ denotes an amount of variation of the threshold voltage due to the substrate voltage. When the capacitor $C_1$ is charged with the clock signal $\phi$ at high level, an amount of charge stored in the capacitor $C_1$ is expressed as $Q_1=C_1 V A_0$. At this time, the MOS transistor $M_1$ does not have the loss of $V_{th}$ because it is of the depression type and hence, a potential at Point A is $V_{Ao}=V_i$.

When the subsequent clock signal $\phi$ rises, it holds for $V_{A1}=V_i+V_\phi$. Here, it is ideal that all the charge stored in the capacitor element $C_1$ be re-charged in the capacitor element $C_2$. However, since the MOS transistor $M_1$ is of the depression type, a charge backflow exists. Provided that the amount of charge backflow is denoted by $Q_{r1}$, the amount of charge stored in the capacitor element $C_2$ is expressed as $Q_2=Q_1-Q_{r1}$. The amount of charge backflow $Q_{r1}$ can be expressed as $Q_{r1}=W^\mu C_{ox}(V_{gs}-(V_{th}+\Delta V_{th(i)}))^2 t/2L$ which is derived from a current expression for the transistor $M_1$ and in which $V_{gs}=0V$ is substituted. That is, the above expression is rewritten as $Q_{r1}=W^\mu C_{ox}(V_{th}+\Delta V_{th}(i))^2 t/2L$, where the symbols W, L, $\mu$, $C_{ox}$ and t denote a gate width of the transistor, a gate length thereof, a carrier mobility, a capacitance of a gate oxide film per unit area, and a charge/discharge time of the capacitor of the charge pump, respectively. According to the expression, the value $Q_{r1}$ can be decreased depending upon the size of the transistor because the threshold voltage $V_{th}$ has the negative value, which results in a small value of the term $V_{th}+\Delta V_{th(i)}$. At this time, a potential at Point B is $V_{B1}=V_{A1}-V_{r1}$ where $V_{r1}$ denotes a voltage loss due to the charge backflow. If $V_\phi > V_{r1}$, the voltage is boosted. In this state, it holds for $V_{r1} \propto Q_{r1}$ and hence, $V_{r1}$ can also be decreased depending upon the gate length L of the transistor.

When the clock signal $\phi$ rises again, the potential at Point B is $V_{B2}=V_{B1}+V_\phi$, whereas the potential at Point C is $V_{C2}=V_{B2}-V_{r2}$. If $V\phi > V_{r2}$, the voltage is increased the same way.

In the final stage section, the value $\Delta V_{th(B)}$ is increased due to the influence of a substrate bias effect. Therefore, the term, $V_{th}+\Delta V_{th(B)}$, takes positive values at a certain and the succeeding points, so that the transistors do not appear to be the depression type any longer. Hence, there occurs no charge backflow and no voltage loss results. This negates the need for increasing the gate length L, thus permitting the size reduction. The size reduction, in turn, involves the loss of $V_{th}$. However, the $V_{th}$ originally has the negative value so that even under the influence of the substrate bias effect, the value of $V_{th}+\Delta V_{th(B)}$ increases to no more than 1V or so. Thus, the loss associated with the $V_{th}$ is also decreased.

According to the embodiment, a high voltage required for erasing data from or writing data to EEPROM (electrically erasable programmable read-only memory) or the like can be supplied by boosting a voltage from the voltage source. Thus, the invention offers an effect to permit the implementation of a single power source.

The above embodiment has been described by way of the example where the N-channel MOS transistors are used. In an alternative approach, there can be configured a circuit for boosting the input voltage $V_i$ in a negative direction by using P-channel MOS transistors.

Although the above embodiment employs the transistors having two different gate lengths L for defining the initial stage section and the final stage section, the same effect as the above can be obtained by using transistors having three or more different gate lengths L. For instance, it is also possible to progressively decrease the gate lengths L from the initial stage transistor toward the succeeding transistors.

The invention employs only one type of depression transistor as a device for forming the charge pump circuit, thus facilitating the implementation of the devices in the fabrication procedure. In addition, the circuit itself is enhanced in reliability by virtue of the decreased number of types of devices constituting the circuit.

On the other hand, the drawback of the charge backflow associated with the use of the depression-type transistor for forming the circuit can be alleviated by increasing the gate length L of the transistors of the initial stage section with respect to the input side, where the influence of the substrate bias effect is small. Thus, highly efficient boosting operations are accomplished.

Furthermore, the invention permits the circuit to be easily optimized simply by changing the layout of devices of a kind, in contrast to the prior art wherein the characteristics of individual devices are modified.

What is claimed is:
1. A charge pump circuit comprising:
  a plurality of transistors individually having a diode connection configuration and defining multiple stages interconnected in cascade, and
  capacitor elements connected to the respective transistors, the circuit designed to obtain a boosted voltage from a final stage of the transistors by inputting a given voltage to an initial stage of the transistors and then alternately applying a clock signal and an inverted clock signal to the plurality of transistors via the respective capacitor elements,
  wherein the plurality of transistors are of depression type; and
  wherein a predetermined number of stages of the transistors have a greater gate length than the succeeding stages of the transistors.

* * * * *